Nov. 16, 1965 W. K. MEISTER 3,217,887
CONTAINER
Filed Jan. 24, 1962
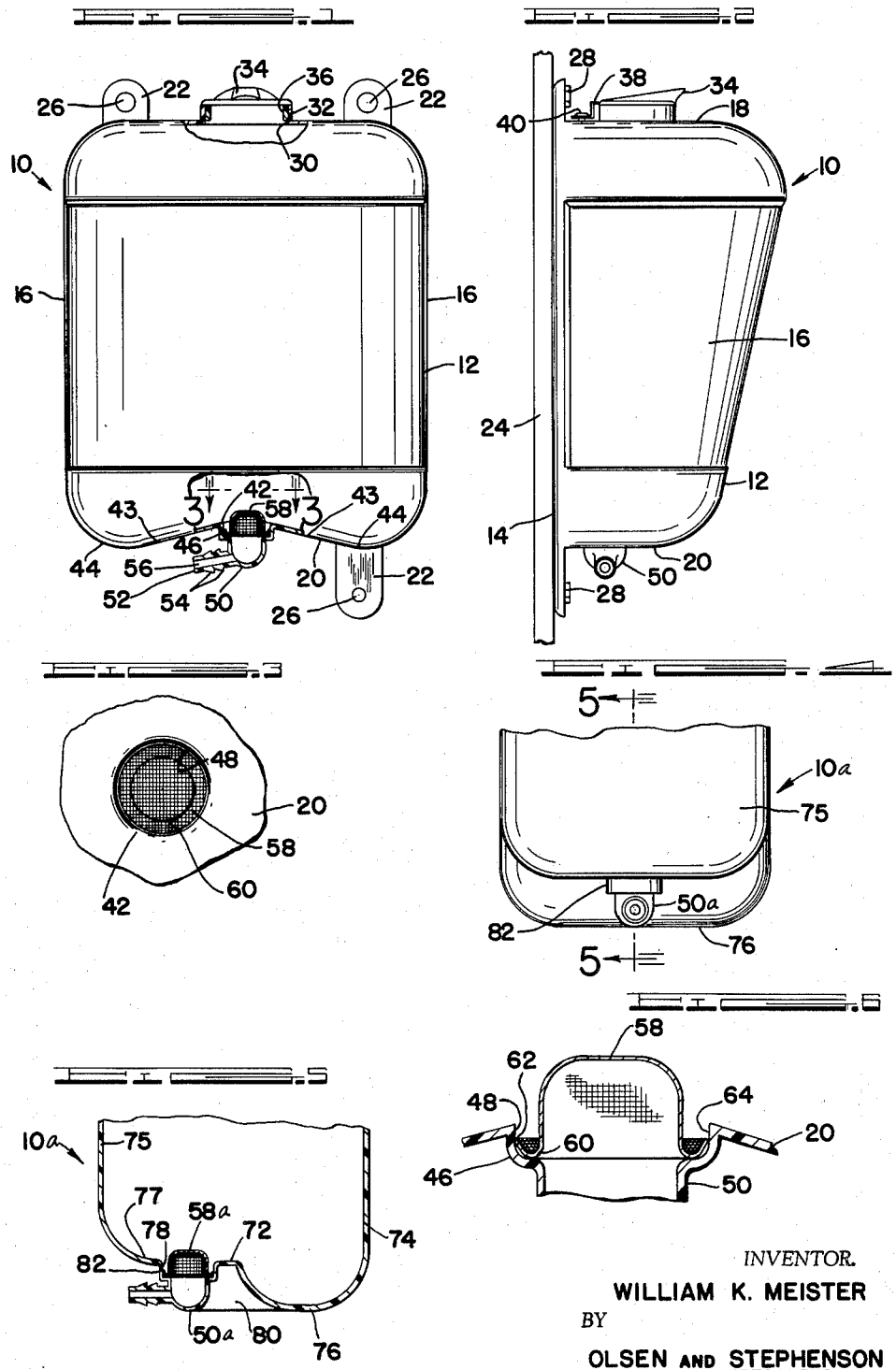
INVENTOR.
WILLIAM K. MEISTER
BY
OLSEN AND STEPHENSON
ATTORNEYS United States Patent Office 3,217,887
Patented Nov. 16, 1965

3,217,887
CONTAINER
William K. Meister, 435 Mills Road, Saline, Mich.
Filed Jan. 24, 1962, Ser. No. 168,470
2 Claims. (Cl. 210—172)

This invention relates generally to windshield clearing systems and more particularly to an improved container for clearing fluid in such systems.

Unbreakable fluid containers or reservoirs which do not require the fluid-tight assembly therewith of attachments such as hose fittings are desirable in windshield clearing systems because maintenance requirements are decreased and the cost of fabrication and assembly of the systems is lowered. It is an object of this invention, therefore, to provide an improved container for such systems which is molded of a rugged plastic material such as high density polyethylene so that it is formed with integral mounting means and hose attachment means.

A further object of this invention is to provide a unitary container for windshield clearing systems which is constructed so as to prevent any sediment or other impurities in the fluid in the container from flowing out of the container and clogging or otherwise impairing the efficiency of the system.

Another object of this invention is to provide a container for windshield clearing systems which includes a filling opening, a discharge opening, and a filter screen for the discharge opening that is readily assembled with the discharge opening by insertion through the filling opening.

Further objects, features and advantages of this invention will become apparent from a consideration of the following description, the appended claims, and the accompanying drawing in which:

FIGURE 1 is a front elevational view of one form of the container of this invention, with some parts broken away and other parts shown in section for the purpose of clarity;

FIGURE 2 is a side elevational view of the container of this invention, shown in a mounted position on a support therefor;

FIGURE 3 is a fragmentary view of the fluid discharge portion of the container of this invention, looking substantially along the line 3—3 in FIG. 1;

FIGURE 4 is a fragmentary elevational view of a lower end portion of a modified form of the container of this invention;

FIGURE 5 is a transverse sectional view of the modified form of the container of this invention, looking substantially along the line 5—5 in FIG. 4; and FIGURE 6 is a fragmentary enlarged view of a portion of the structure shown in FIG. 1.

With reference to the drawing, the container or fluid reservoir of this invention, indicated generally at 10, is illustrated in FIGS. 1 and 2 as including a unitary molded plastic body 12 having an upright back or mounting wall 14, side walls 16, a substantially horizontal top wall 18, and an irregularly shaped bottom wall 20. A plurality of flat mounting lugs 22, illustrated as three in number, are formed integral with the back wall 14 to enable mounting of the container 10 on an upright support 24 (FIG. 2) which may be any convenient supporting member in the vehicle on which the container 10 is supported. Each mounting lug 22 is provided with an opening 26 through which a screw or bolt 28 is extended and inserted in the supoprt 24 to mount the container 10 on the support 24.

The top wall 18 is formed with a filling opening 30 which is surrounded by an upwardly extending neck 32. A plastic cap or cover 34 has a downwardly extending flange 36 of a size and shape to be frictionally telescoped into the upper end of the neck 32 so that the cap 34 closes the opening 30. The cap 34 has an integral hinge strap 38 which is secured to the top wall 18 by a plastic rivet 40 so as to hingedly mount the cap 34 on the top wall 18.

As shown in FIG. 1, the bottom wall 20 is of an irregular downwardly curved configuration having horizontally spaced portions 42 and 44 which are vertically offset and are connected by inclined portions 43 which slope downwardly away from the uppermost portion 42. The portion 42, which constitutes a raised portion of the bottom wall 20, is formed on its outer side with an integral tubular boss 46 which surrounds a discharge opening 48 formed in the bottom wall 20. A hollow hose fitting 50 extends downwardly from and is integral with the boss 46 so as to be in fluid communication with the interior of the boss 46. The hose fitting 50 includes an elongated tubular portion 52 which has annular projections 54 on its exterior surface to facilitate the mounting of a hose (not shown) on the tubular portion 52. An axial fluid discharge passage 56 in the tubular portion 52 communicates with the hollow interior of the hose fitting 50 and is thus in fluid communication through the tubular boss 46 with the interior of the container 10.

A filter screen 58 which is of generally dome-shape is assembled with the bottom wall 20 so as to filter the fluid flowing out of the discharge opening 48 in the bottom wall 20. As shown in FIG. 6, the screen 58 has a radially outwardly and upwardly curved peripheral flange 60 which is return-bent upon itself and is of a diameter such that the radially outer edge 62 thereof will engage the inner wall 64 of the boss 46. The screen 58 is assembled with the bottom wall 20 by inserting it through the filling opening 30 and forcing it into the boss 46 as shown in FIGS. 1 and 6 so that the edge 62 of the screen flange 60 is staked into the boss 46. As a result, any tendency of the screen 58 to be moved in a direction upwardly out of the boss 46 is prevented by engagement of the flange edge 62 with the inner surface 64 of the boss 46. As shown in FIGS. 1 and 3, the screen 58 is of a size relative to the filling opening 30 such that it can be readily inserted through the filling opening 30 for assembly with the boss 46.

As a result of the location of the discharge opening 48 in a portion 42 of the bottom wall 20 which is disposed above other portions of the bottom wall 20, such as the portions 44 any sediment or other impurities which settle in the container 10 are readily washed away from the screen 58 so that they travel onto the portions 44 where the sediment and impurities can accumulate without affecting the free flow of fluid through the screen 58. The movement of the automobile effects sufficient movement of the fluid in the container 10 to provide for a washing of the sediment away from the screen 58 and down the inclined bottom wall portions 43 onto the portions 44.

A modified container 10a is shown in FIG. 4 which is substantially identical to the container 10 except for the construction of the lower end portion thereof. Consequently, only the lower end portion of the container 10a is illustrated in FIGS. 4 and 5. As shown therein, the bottom wall 72 of the container 10a is provided adjacent the container rear wall 74 with a downwardly extending portion 76 which constitutes the sediment collecting portion of the container 10a, and is provided adjacent the container front wall 75 with a portion 77 disposed above the portion 76 and constituting a raised portion of the bottom wall 72. A hollow boss 82 and a hose fitting 50a, identical to the hose fitting 50 previously described, are integrally molded with the bottom wall 72 so that the fitting 50a communicates with a discharge opening 78 which is formed in the bottom wall 72 at a position above the sediment collecting portion 76. A screen 58a, identical to the screen 58 previously described, is assembled in the opening 78.

A reinforcing web 80, integral with the hose fitting 50a and the bottom wall 72, extends between the hose fitting 50a and the sediment collecting portion 76. As shown in FIG. 5, the hose fitting 50a is positioned so that it is located generally in a vertical plane extending between the back and front walls 74 and 75 and the web 80 is positioned substantially in the same plane. Also, the hose fitting 50a extends downwardly to about the level of the sediment collecting portion 76 so that the fitting 50a is protected against accidental damage and blows which might break it off the bottom wall 72.

From the above description it is seen that this invention provides containers 10 and 10a which are readily mounted in a windshield clearing system by virtue of the integral mounting lugs 22 which are formed on the container during molding. By virtue of the forming of the containers 10 and 10a with the integral hose fittings 50 and 50a, the containers 10 and 10a are in condition for assembly in clearing systems without having to assemble additional hose fittings or the like. Because the hose fittings in this invention are integral with the container a fluid tight assembly is insured. Furthermore, by virtue of the particular construction of the bottom walls of the containers and the assembly therewith of the filter screens 59 and 58a, operation of the clearing systems without clogging is assured.

It will be understood that the containers which are herein disclosed and described are presented for purposes of explanation and illustration and are not intended to indicate limits of the invention, the scope of which is defined by the following claims.

Having thus described the invention, I claim:

1. In a windshield clearing system for an automotive vehicle, a fluid container adapted to be mounted on said vehicle, said container comprising a unitary hollow body formed of a rigid plastic material and having a substantially flat upright back wall, a plurality of mounting lugs for said container formed integral with said back wall, front and side walls formed integral with said back wall, a top wall provided with a filling opening of predetermined size, and a bottom wall, said bottom wall having a raised portion and a lower portion, said raised portion being disposed above and communicating with said lower portion, a hose fitting formed integrally with said raised portion of said bottom wall on the exterior surface thereof and having a fluid passage extending therethrough, said raised bottom wall portion having an opening therein communicating with said fluid passage, means forming an annular cavity in said raised bottom wall portion and having an annular wall surrounding said opening, and a dome shape filter screen having a radially outwardly and upwardly extending peripheral flange, said flange being of a size smaller than said filling opening and being positioned in said cavity so that the radially outer edge of said screen is in engagement with and staked into said annular wall.

2. The combination according to claim 1 further including a reinforcing web formed integral with said bottom wall and said hose fitting.

References Cited by the Examiner

UNITED STATES PATENTS

| | | | |
|---|---|---|---|
| 488,473 | 12/1892 | Fruen | 222—185 X |
| 1,276,271 | 8/1918 | Rossignol | 210—282 |
| 1,582,646 | 4/1926 | Flesch et al. | 210—166 |
| 2,753,910 | 7/1956 | Neufeld | 15—250.01 X |
| 2,830,740 | 4/1958 | Landis | 222—189 X |
| 2,879,818 | 3/1959 | Root | 150—.5 |
| 3,056,911 | 10/1962 | Hart et al. | 15—250.01 X |
| 3,059,802 | 10/1962 | Mitchell | 150—.5 X |

REUBEN FRIEDMAN, *Primary Examiner.*

HERBERT A. MARTIN, *Examiner.*

UNITED STATES PATENT OFFICE
CERTIFICATE OF CORRECTION

Patent No. 3,217,887                                November 16, 1965

William K. Meister

It is hereby certified that error appears in the above numbered patent requiring correction and that the said Letters Patent should read as corrected below.

In the grant, lines 1 to 3, for "William K. Meister, of Saline, Michigan," read -- William K. Meister, of Saline, Michigan, assignor to Hoover Ball and Bearing Company, of Saline, Michigan, a corporation of Michigan, --; line 12, for "William K. Meister, his heirs" read -- Hoover Ball and Bearing Company, its successors --; in the heading to the printed specification, line 3, for "William K. Meister, 435 Mills Road, Saline, Mich." read -- William K. Meister, Saline, Mich., assignor to Hoover Ball and Bearing Company, Saline, Mich., a corporation of Michigan --; column 3, line 29, for "59" read -- 58 --.

Signed and sealed this 11th day of October 1966.

(SEAL)
Attest:

ERNEST W. SWIDER                                EDWARD J. BRENNER
Attesting Officer                               Commissioner of Patents